US 6,314,447 B1

(12) United States Patent
Lea et al.

(10) Patent No.: US 6,314,447 B1
(45) Date of Patent: Nov. 6, 2001

(54) SYSTEM USES LOCAL REGISTRY AND LOAD BALANCING PROCEDURE FOR IDENTIFYING PROCESSING CAPABILITIES OF A REMOTE DEVICE TO PERFORM A PROCESSING TASK

(75) Inventors: Rodger J. Lea; Scott D. Smyers, both of San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/411,520

(22) Filed: Oct. 4, 1999

(51) Int. Cl.[7] .............................. G06F 9/00; G06F 15/16
(52) U.S. Cl. ..................... 709/105; 709/100; 709/201
(58) Field of Search .................... 702/186; 714/1; 709/105, 100; 711/219; 710/15, 16, 18, 58

(56) References Cited

U.S. PATENT DOCUMENTS

| 4,893,199 | | 1/1990 | Okada ......................................... 360/48 |
| 4,905,171 | * | 2/1990 | Kiel et al. ............................... 702/186 |
| 5,420,573 | | 5/1995 | Tanaka et al. ...................... 340/825.24 |
| 5,446,874 | * | 8/1995 | Waclawsky et al. ....................... 714/1 |
| 5,537,605 | | 7/1996 | Teece ....................................... 395/800 |
| 5,701,482 | * | 12/1997 | Harrison et al. ....................... 709/105 |
| 6,085,236 | * | 7/2000 | Lea ........................................... 709/220 |
| 6,105,119 | * | 8/2000 | Kerr et al. ............................. 711/219 |
| 6,119,186 | * | 9/2000 | Watts et al. ............................ 710/104 |

FOREIGN PATENT DOCUMENTS 2767795   3/1989   (JP) .

OTHER PUBLICATIONS

Igarashi et al. "Home Network File System for Home Network Based on IEEE–1394 Technology", Jun. 28, 1999, pp. 1000–1003, IEEE.*

Igarashi et al. "Home Network File System for Home Network Based on IEEE–1394 Technology", Jan. 1999, pp. 150–151, IEEE.*

Copyright 1997, 1998 by Grundig, Hitachi, Matsushita, Philips, Sharp, Sony, Thomson and Toshiba; The HAVi Architecture, Version 1.0, Specification of the Home Audio/Video Interoperability (HAVi) Architecture; Nov. 19, 1998; pp. I–XXV and 1–384.

* cited by examiner

*Primary Examiner*—Le Hien Luu
(74) *Attorney, Agent, or Firm*—Gregory J. Koerner; Simon & Koerner LLP

(57) ABSTRACT

A system and method for determining processing capabilities of devices in an electronic network comprises a host device that creates and locally registers one or more processor FCMs that include self-describing data from corresponding remote hosted devices in the electronic network. A device application from the host device may then query the self-describing data to determine relative processing capabilities of the hosted devices in order to perform a first-level load-balancing procedure.

The device application may also utilize the various processor FCMs to determine current processing-load levels for the various hosted devices to thereby perform a second-level load-balancing procedure. In addition, the device application may utilize the processor FCM to perform one or more sniplet procedures in which hosted devices may advantageously download and execute segments of software code from the device application to assist in a particular task.

38 Claims, 10 Drawing Sheets

SYSTEM USES LOCAL REGISTRY AND LOAD BALANCING PROCEDURE FOR IDENTIFYING PROCESSING CAPABILITIES OF A REMOTE DEVICE TO PERFORM A PROCESSING TASK

CROSS-REFERENCE TO RELATED APPLICATIONS

This application relates to co-pending U.S. patent application Ser. No. 09/257,344, entitled "System And Method For Implementing Active Registries In An Electronic Network," filed on Feb. 25, 1999, to co-pending U.S. patent application Ser. No. 09/397,755, entitled "System And Methodology For Discovering Extended Capabilities Of Devices In An Electronic Network," filed on Sep. 16, 1999, which are hereby incorporated by reference. The foregoing cross-referenced applications are commonly assigned.

BACKGROUND OF THE INVENTION

1. Field of the Invention

This invention relates generally to electronic networks, and relates more particularly to a system and method for determining processing capabilities of devices in an electronic network.

2. Description of the Background Art

Implementing an effective method for utilizing processing capabilities of electronic devices within an electronic network is a significant consideration for manufacturers and designers of contemporary electronic systems. An electronic device in a distributed electronic network may advantageously communicate with other remote electronic devices in the network to share and substantially increase the resources available to individual devices in the network. For example, an electronic network may be implemented in a user's home to enable flexible and beneficial sharing of resources between various consumer electronic devices, such as personal computers, digital video disk devices, digital set-top boxes for digital broadcasting, television sets, and audio playback systems.

Managing and controlling a network of electronic devices may create substantial challenges for designers of electronic networks. For example, enhanced demands for increased functionality and performance may require more system processing power and require additional hardware resources across the network. An increase in processing or hardware requirements may also result in a corresponding detrimental economic impact due to increased production costs and operational inefficiencies. Furthermore, efficiently accessing the increased functionality may pose certain problems.

Network size is also a factor that affects the control and management of an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software module on the local device may need to communicate with various remote software elements on remote devices across the electronic network. However, successfully managing a substantial number of electronic devices across a single network may provide significant benefits to a system user.

Furthermore, enhanced device capability to perform various advanced processing functions may provide additional benefits to a system user, but may also place increased demands on the control and management of the various devices in the electronic network. For example, an enhanced electronic network that effectively accesses, processes, and displays digital television programming may benefit from efficient network management techniques because of the large amount and complexity of the digital data involved.

In addition, the presence of electronic devices with extended processing capabilities and functionality may present a need for creating efficient techniques to allow discovery of the extended capabilities by various software elements in the network. For example, if an enhanced video cassette recorder (VCR) with extended capabilities is added to the network, then the other software elements in the network may require information about the existence and processing capabilities of the newly-added VCR, so that all software elements in the network may advantageously utilize the extended capabilities of the newly-added software device.

Therefore, for all the foregoing reasons, implementing an efficient method for utilizing processing capabilities of electronic devices in a distributed electronic network remains a significant consideration for designers, manufacturers, and users of electronic systems.

SUMMARY OF THE INVENTION

In accordance with the present invention, a system and method are disclosed for determining processing capabilities of devices in an electronic network. In one embodiment of the invention, initially, network software in a host device monitors the electronic network to determine whether a system user has recently connected a new device to the electronic network. If a system user has connected a new device to the electronic network, then the electronic network preferably generates a bus reset event to notify interested devices about the presence of the new device. In response, a software module in the host device preferably performs a device discovery process to learn about the new device.

In accordance with one embodiment of the present invention, a DCM manager preferably performs the foregoing device discovery process by querying relevant configuration information stored in self-describing data (SDD) of the new device. In accordance with the present invention, the DCM manager may also concurrently discover relevant processing capabilities of the new device during the foregoing device discovery process. In alternate embodiments, the processing capabilities may be similarly discovered in a query procedure that is separate from the foregoing device discovery process.

Next, the host device preferably begins to actively host the new device which therefore may be referred to as a hosted device. In certain embodiments, the DCM manager locally instantiates a new device control module (DCM) for controlling the hosted device. In accordance with the present invention, the DCM manager also preferably locally instantiates a processor functional control module (processor FCM) for interacting with the hosted device. Furthermore, the DCM manager preferably creates a processor FCM registration and a DCM registration to register the new processor FCM and the new DCM into a local registry. In accordance with the present invention, the foregoing processor FCM registration may include one or more processing capabilities obtained from the SDD of the hosted device or obtained from other appropriate sources In accordance with the present invention, a device application (or any other software module) may require a given hosted device to perform a particular processing task. In certain embodiments, the device application preferably may query the local registry for a processor FCM registration corresponding to the processor FCM of the desired hosted device. The device application may also query a processor FCM attribute list in the processor FCM registration to examine relevant processor capabilities of the hosted device. Alternately, the device application may utilize the processor to directly query the self-describing data of the remote device to examine relevant processing capabilities of the remote device.

The device application may then determine whether the hosted device has sufficient processing capabilities to perform the required processing task. In many cases, the host device may host multiple hosted devices from the electronic network. The device application may then advantageously perform a first-level load-balancing process by evaluating and comparing the processing capabilities of each hosted device to determine the most appropriate hosted devices based on their relative processing capabilities.

The device application may also transmits a get_load request to the processor FCM to determine a current processing-load status of the hosted device. In response, a loading module of the processor FCM preferably propagates the get_load request to a load analyzer in the hosted device. The load analyzer then determines the current processing load of the hosted device, and returns a current processing-load status to the device application via the processor FCM. In one embodiment, the current processing-load status may include, but is not limited to, a processor load, a memory load, and an input/output (I/O) load.

The device application may then advantageously determine whether the hosted device is too heavily loaded to effectively perform the required processing task. In the case of multiple hosted devices, the device application may perform a second-level load-balancing process by similarly evaluating and comparing the processing loads of each hosted device to determine the most appropriate hosted devices based on relative processing loads.

In accordance with the present invention, the device application may also advantageously utilize the processor FCM to perform a sniplet procedure using the hosted device. A sniplet preferably includes one or more segments of executable software code for assisting with a particular task. The device application preferably may transmit one or more sniplet commands to the processor FCM which responsively causes EL capable hosted device to download the sniplet and perform a corresponding action. For example, the sniplet commands may include, but are not limited to, a load_sniplet command, a start_sniplet command, a synch_sniplet command, a stop_sniplet command, an unload_sniplet, and a status command. For all the foregoing reasons, the present invention thus determines and effectively utilizes the processing capabilities of devices in an electronic network.

DETAILED DESCRIPTION OF THE PREFERRED EMBODIMENT

The present invention relates to an improvement in electronic network technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for determining processing capabilities of devices in an electronic network, and includes a host device that creates and locally registers one or more processor FCMs that include self-describing data from corresponding remote hosted devices in the electronic network. A device application from the host device may then query the self-describing data to determine relative processing capabilities of the hosted devices in order to perform a first-level load-balancing procedure.

The device application may also utilize the various processor FCMs to determine current processing-load levels for the various hosted devices to thereby perform a second-level load-balancing procedure. In addition, the device application may utilize the processor FCM to perform one or more sniplet procedures in which hosted devices may download and execute segments of software code from the device application to assist in a particular task.

Figure 1:
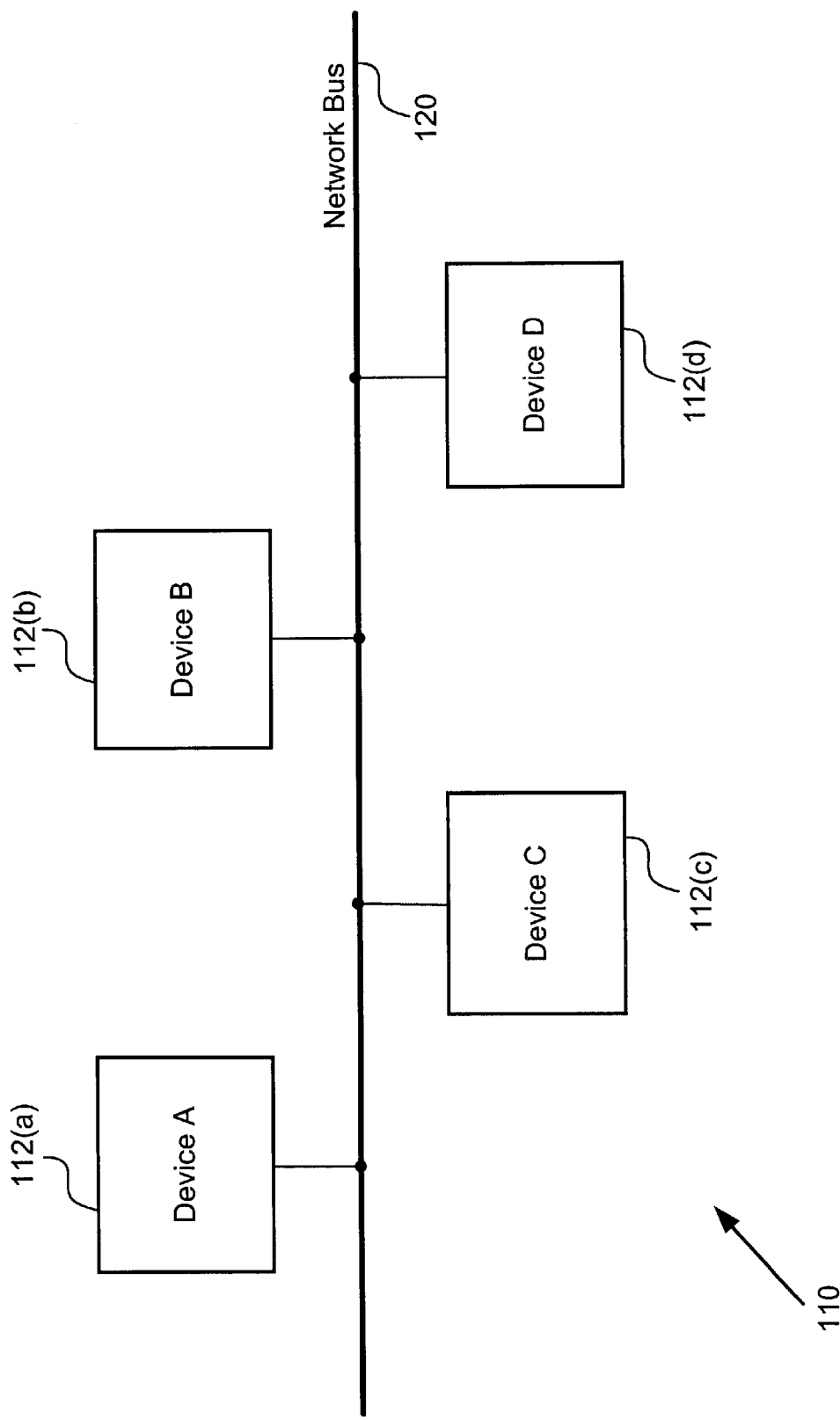
FIG. 1 is a block diagram for one embodiment of an electronic network, in accordance with the present invention.

Referring now to FIG. 1, a block diagram for one embodiment of an electronic network 110 is shown, in accordance with the present invention.

In the FIG. 1 embodiment, network 110 includes, but is not limited to, device A 112(*a*), device B 112(*b*), device C 112(*c*), and device D 112(*d*). In other embodiments, network 110 may readily be implemented using a larger or smaller number of devices than the four devices (device A 112(*a*) through device D 112(*d*)) shown in the FIG. 1 embodiment.

In the FIG. 1 network 110, device A 112(*a*), device B 112(*b*), device C 112(*c*), and device D 112(*d*) preferably communicate with each other through a commonly-shared network bus 120. In the FIG. 1 embodiment, network bus 120 is preferably implemented according to the IEEE 1394 interconnectivity standard. However, in alternate embodiments, other appropriate and compatible interconnectivity standards are also contemplated for use in conjunction with the present invention.

In the FIG. 1 embodiment, network 110 may preferably be configured to operate in accordance with the Home Audio/Video Interoperability (HAVi) core specification (version 1.0 beta, at www.HAVi.org) which is hereby incorporated by reference. Therefore, device A 112(a), device B 112(b), device C 112(c), and device D 112(d) may be implemented as various types of consumer electronics devices, including, but not limited to, personal computers, digital video disk devices, television sets, audio reproduction systems, video tape recorders (VCRs), and set-top boxes for digital video broadcasting. However, in various alternate embodiments, network 110 may readily be implemented as any appropriate electronic network configured to permit communication between any desired types of electronic devices.

In the FIG. 1 embodiment, the various electronic devices that form part of network 10 preferably include the following four categories of electronic devices: full devices (FD), intermediate devices (ID), base devices (BD), and legacy devices (LD). The foregoing four categories of electronic devices (FD, ID, BD, and LD) are further discussed below in conjunction with FIGS. 2 and 3. In alternate embodiments of the present invention, network 110 may readily include various other categories of electronic devices in addition to, or instead of, the four categories of FD, ID, BD, and LD.

Figure 2:
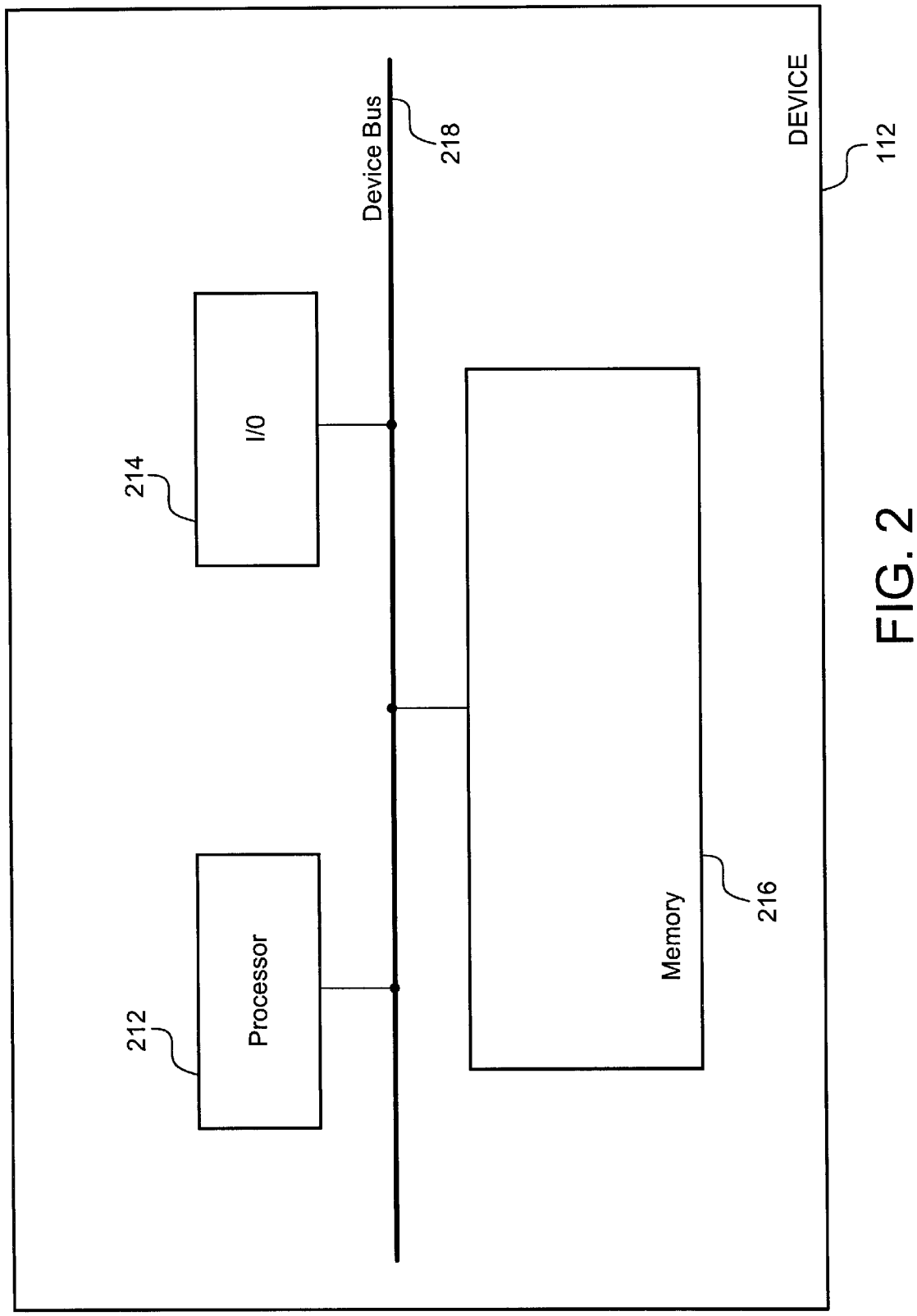
FIG. 2 is a block diagram for one embodiment of an exemplary device from FIG. 1, in accordance with the present invention.

Referring now to FIG. 2, a block diagram for one embodiment of an exemplary device 112 from FIG. 1 is shown, in accordance with the present invention. In the FIG. 2 embodiment, device 112 preferably includes, but is not limited to, a processor 212, an input/output interface (I/O) 214, and a memory 216 that are each coupled to, and communicate with each other via, common device bus 218. In the FIG. 2 embodiment, device 112 is preferably configured to represent either a full device or an intermediate device, as referred to above in the discussion of the FIG. 1 network 110.

In the FIG. 2 embodiment, processor 212 may be implemented to include any appropriate and compatible generic, multi-purpose microprocessor device. The FIG. 2 input/output interface (I/O) 214 preferably provides an effective interface to facilitate communications between device 112 and network bus 120 (FIG. 1). In the FIG. 2 embodiment, memory 216 may be implemented to include any combination of desired storage devices, including, but not limited to, read-only memory (ROM), random-access memory (RAM), and various types of non-volatile memory, such as floppy disks or hard disks. The contents and functionality of memory 216 are further discussed below in conjunction with FIGS. 3 and 4.

Figure 3:
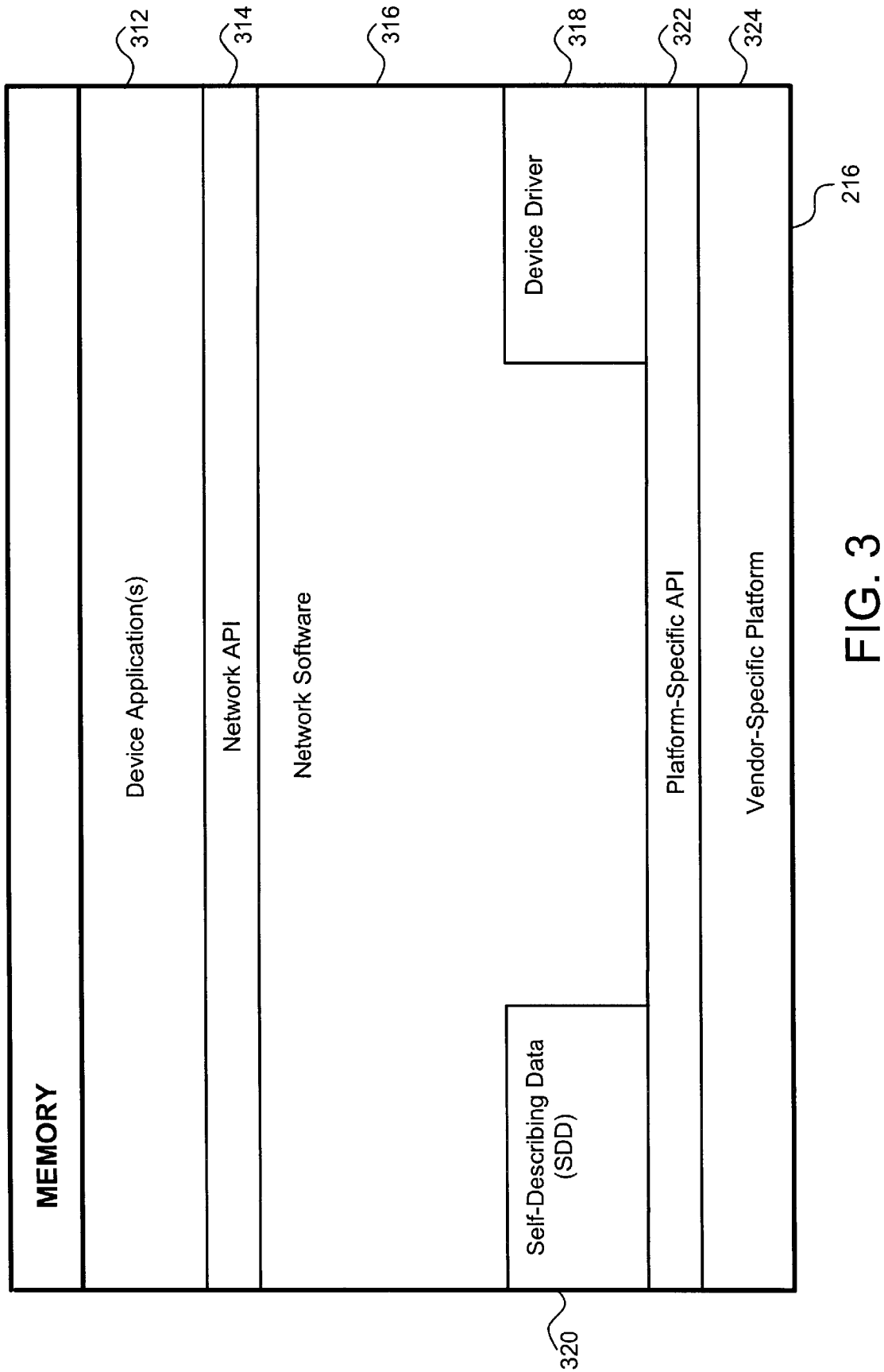
FIG. 3 is a diagram for one embodiment of the memory of FIG. 2, in accordance with the present invention.

Referring now to FIG. 3, a diagram for one embodiment of FIG. 2 memory 216 is shown, in accordance with the present invention. In the FIG. 3 embodiment, memory 216 includes one or more device applications 312, a network application program interface (API) 314, network software 316, self-describing data (SDD) 320, a device driver 318, a platform-specific application program interface (API) 322, a vendor-specific platform 324, and one or more extended application program interface(s) (extended APIs) 326. In alternate embodiments, memory 216 may readily include various components and elements that are different from, or in addition to, those components 312 through 324 discussed in conjunction with the FIG. 3 embodiment.

In the FIG. 3 embodiment, device application 312 preferably includes software instructions that are executed by processor 212 (FIG. 2) to effectively manage and control the functionality of device 112. Network API 314 preferably serves as an interface between various elements of network software 316 and device application 312.

In the FIG. 3 embodiment, network software 316 preferably includes one or more software elements that are executed by processor 212 to advantageously permit device 112 to communicate and cooperate with other devices in network 110. The contents and functionality of network software 316 are further discussed below in conjunction with FIG. 4.

Self-describing data (SDD) 320 preferably includes various types of relevant information regarding device 112. For example, SDD 320 may include information specifying the manufacturer, model, version, serial number, and other fixed data that specifically corresponds to device 112. Device driver 318 preferably includes appropriate software instructions that permit device 112 to communicate with network bus 120 (FIG. 1).

In the FIG. 3 embodiment, platform-specific API 322 provides an interface that preferably permits network software 316 to communicate with vendor-specific platform 324. In the FIG. 3 embodiment, vendor-specific platform 324 may include basic operating system software for supporting low-level operations of device 112.

The FIG. 3 embodiment of memory 216 typically corresponds to a full device (or FD, as discussed above in conjunction with FIG. 1) that preferably includes a complete set of network software 316 to permit optimal compatibility and functionality with network 110. Alternately, memory 216 may correspond to an intermediate device (ID) which includes only a reduced set of software elements from network software 316. In contrast, a base device (BD) is preferably hosted on network 110 by a full device or an intermediate device, and therefore typically does not include network software 316. A base device, however, preferably does include self-describing data 320 and a device driver 318.

A legacy device (LD) may be defined as a device that does not comply with the architectural specifications of network 110 and network software 316. Legacy devices typically were designed and manufactured prior to the design and implementation of network 110 and network software 316. Therefore, a legacy device is preferably hosted on network 110 by a full device or an intermediate device, and typically does not include network software 316 or self-describing data 320. A digital base device, however, may include device driver 318 for interfacing with network bus 120. Full devices, intermediate devices, base devices, and legacy devices are further discussed in the Home Audio/Video Interoperability (HAVi) core specification (see pages 3 through 22) that has been previously incorporated by reference.

Figure 4:
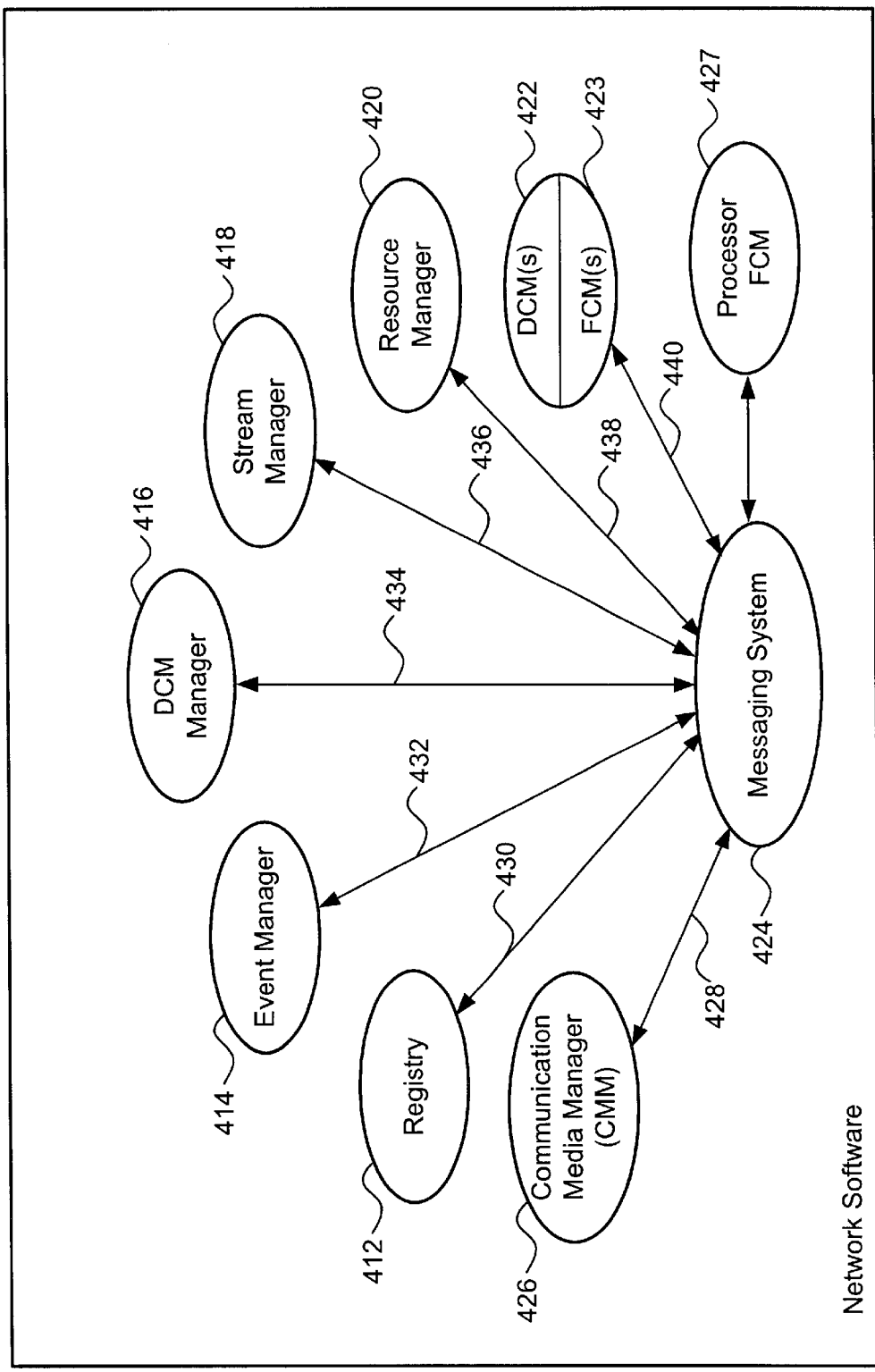
FIG. 4 is a diagram for one embodiment of the network software of FIG. 3, in accordance with the present invention.

Referring now to FIG. 4, a diagram for one embodiment of the network software 316 of FIG. 3 is shown, in accordance with the present invention. In the FIG. 4 embodiment, network software 316 preferably comprises a number of software elements, including a registry 412, an event manager 414, a device control module (DCM) manager 416, a stream manager 418, a resource manager 420, one or more device control modules (DCMs) 422 and one or more corresponding functional control modules (FCMs) 423, a messaging system 424, a communication media manager (CMM) 426, and a processor functional control module (processor FCM) 427.

In the FIG. 4 embodiment, software elements 412 through 427 are preferably configured to function in accordance with the Home Audio/Video Interoperability (HAVi) architecture which has previously been incorporated herein by reference. However, in alternate embodiments, network software 316 may readily conform to any other appropriate and compatible interoperability architecture, and may also include various software elements that are different from, or in addition to, those elements 412 through 427 that are presented in the FIG. 4 embodiment.

In the FIG. 4 embodiment, registry 412 may preferably include a listing of software elements in network software 316. Registry 412 also preferably may include relevant element information or attributes corresponding to the listed software elements. For example, elements 412 through 427 from network software 316 and corresponding element information may be listed in registry 412. Registry 412 therefore may serve as a directory service for applications 312 or software elements in network 110. Registry 412 may thus allow any application or software element to obtain a software element identifier (SEID) for identifying and locating another software element in network 110. In accordance with the present invention, registry 412 may also include a remote registry list that identifies all remote registries on network 110.

In the FIG. 4 embodiment, event manager 414 preferably serves as a network-event notification service to notify various software elements (that have previously subscribed for notification) about the occurrence of a specified network event, such as a change in a software element or a change in network 110. DCM manager 416 is preferably responsible for installing and removing DCMs 422 on full devices or intermediate devices. Stream manager 418 is preferably responsible for managing real-time transfer of data and other information between various functional components of network 110.

In the FIG. 4 embodiment, resource manager 420 preferably facilitates the sharing of various resources and scheduling of various actions in network 110. A device control module (DCM) 422 preferably includes a software element that is used to control a specific associated device on network 110. A given DCM 422 preferably includes one or more directly-corresponding functional control modules (FCMs) 423 that each control a specific functional component within the particular device 112 that corresponds to the FCM 423. A full device or an intermediate device may preferably host a DCM 422 to control a remote base device or a remote legacy device on network 110. In the FIG. 4 embodiment, messaging system 424 is preferably responsible for bi-directionally transferring various messages between the software elements of network software 316. Communication media manager (CMM) 426 coordinates and manages asynchronous and isochronous communications through device driver 318 onto network bus 120. In accordance with the present invention, processor FCM 427 preferably may be utilized to communicate with a corresponding hosted device to determine various processing capabilities. The functionality and utilization of processor FCM 427 is further discussed below in conjunction with FIGS. 6 through 10.

Network software 316 preferably performs a number of significant and related operations whenever a particular device is removed from, or added to, network 110. When a device is added or removed from network 110, then network bus 120 preferably triggers a bus reset event which notifies all connected devices about the change in network 110. Following the bus reset event, all DCM managers 416 in network 110 preferably perform a negotiation procedure to determine which, if any, DCM manager 416 is the most appropriate host for controlling the newly-added device. Each DCM manager 416 in network 110 may therefore maintain a current list of all devices in network 110. Once a given DCM manager 416 is selected as host, that host DCM manager 416 responsively instantiates a new DCM 422 as an abstraction of the control interface of the newly-added device. Network software 316 preferably also updates relevant software element information in registry 412 whenever a device is removed from, or added to, network 110.

Figure 5:
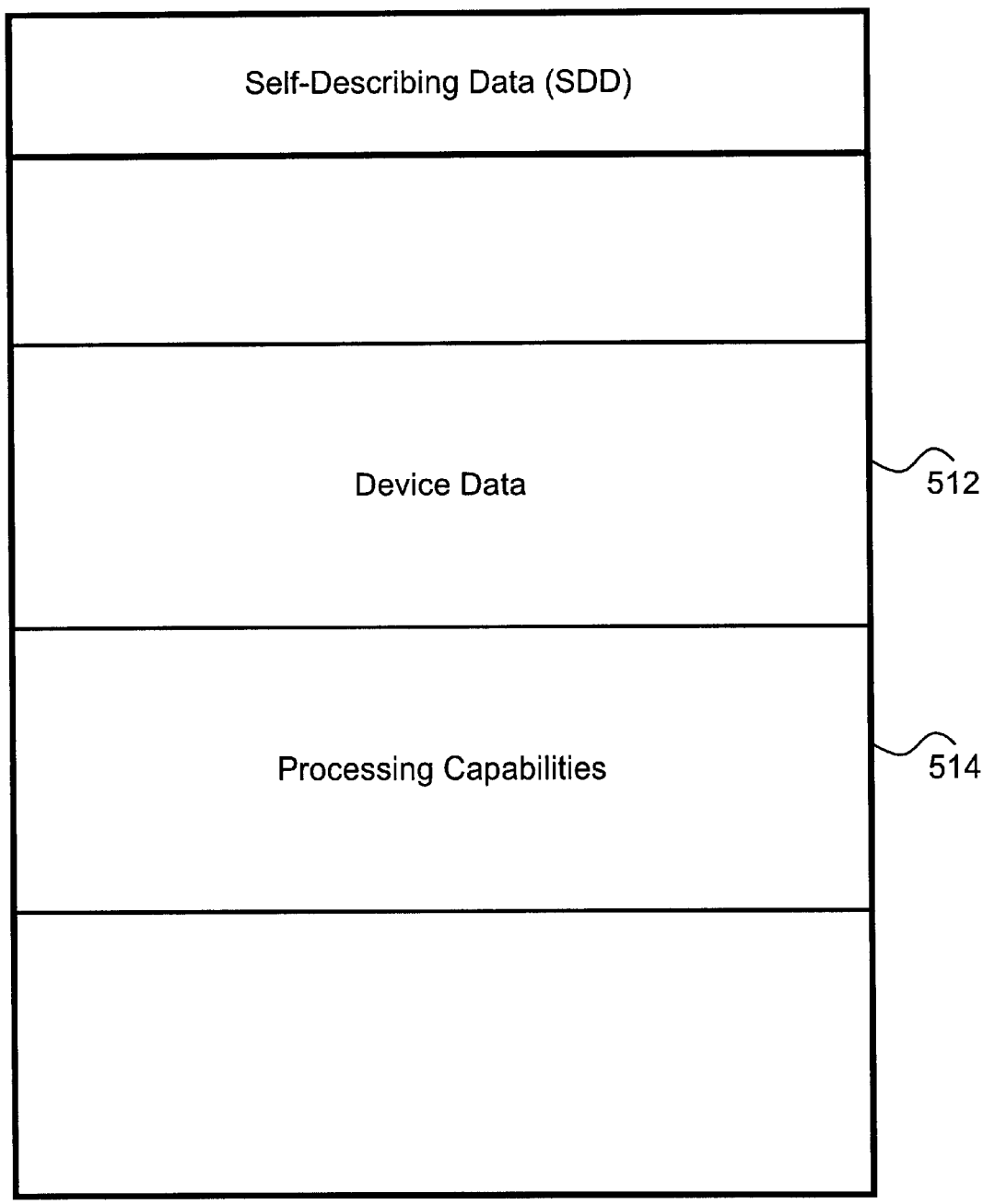
FIG. 5 is a diagram for one embodiment of the self-describing data of FIG. 3, in accordance with the present invention.

Referring now to FIG. 5, a diagram for one embodiment of the FIG. 3 self-describing data (SDD) 320 is shown, in accordance with the present invention. In the FIG. 5 embodiment, SDD 320 includes, but is not limited to, device data 512 and processing capabilities 514. The FIG. 5 embodiment of SDD 320 is preferably included as part of a configuration read-only memory (ROM) that is implemented according to an IEEE 1212 configuration read-only memory specification that is hereby incorporated by reference. In addition, one configuration of SDD 320 is described in section 9 of the Home Audio/Video Interoperability (HAVi) specification which has previously been incorporated herein by reference.

Device data 512 preferably include items that relate to basic characteristics or functions of the particular device that corresponds to SDD 320. For example, if the device is a VCR, Then device data 512 may include information identifying device as a VCR, as well as other relevant information such as manufacturer, model, and version level.

In the FIG. 5 embodiment, processing capabilities 514 preferably include one or more fields that correspond to various processing abilities or functionalities of the corresponding device on network 110. In the FIG. 5 embodiment, processing capabilities 514 may include, but are not limited to, a processor capability, a memory capability, and an input/output (I/O) capability. In addition, processing capabilities 514 may include a sniplet capability that indicates whether the corresponding device is capable of downloading and running sections of program code called sniplets, as discussed below in conjunction with FIGS. 9 and 10, In the FIG. 5 embodiment, the foregoing processor capability may include information about the processor o:f the corresponding device, including processor type and machine instructions per second (MIPS) rating. Alternately, processor capability may be a scalar numerical rating (for example, a rating on a scale of one to ten) that may be referenced to a corresponding table by an interested entity in network 1 10. Similarly, the foregoing memory capability may include detailed information on memory size, speed, and configuration, or alternately be implemented as a scalar numerical rating. The I/O capability may include relevant input/output information such as whether the corresponding device is able to read/write on the particular network bus (for example, the IEEE 1394 serial bus).

In certain embodiments, the processor capability (P), the memory capability (M), and the I/O capability (I) may be combined into a combined processing capability rating value (R) that is preferably weighted based on the relative importance of the various capabilities. In the FIG. 5 embodiment, the combined processing capability rating value (R) may be weighted in a 3-2-1 ratio according to the following formula:

$$R=3(P)+2(M)+1(I)$$

In alternate embodiments, the combined processing capability rating value may be calculated with capacity variables in addition to, or instead of, those of the FIG. 5 embodiment. Similarly, in alternate embodiments, the weighting ratio may also be different that that of the FIG. 5 embodiment. The utilization of processing capabilities 514 is further discussed below in conjunction with FIG. 8

Figure 6:
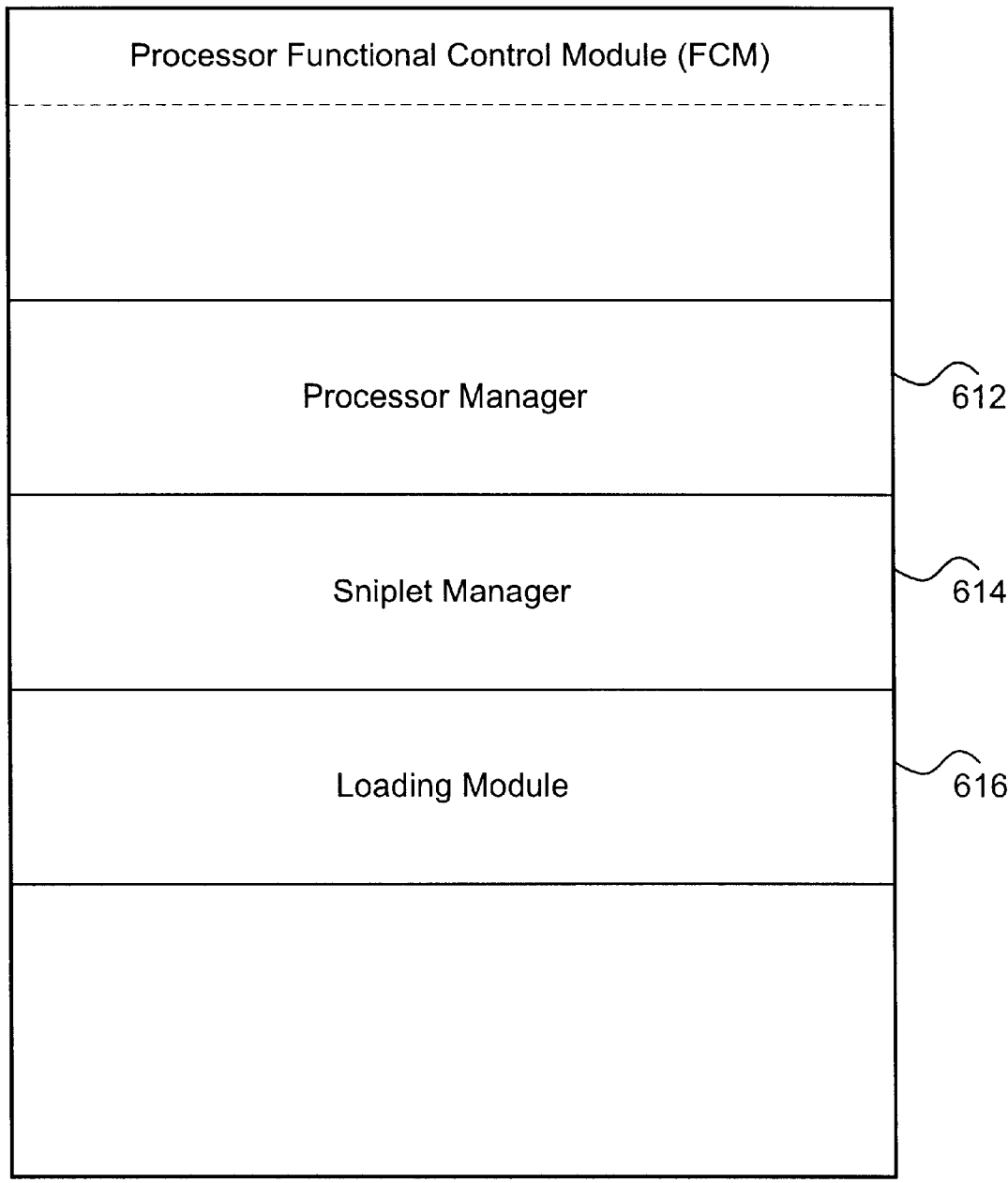
FIG. 6 is a diagram for one embodiment of the processor function control module of FIG. 4, in accordance with the present invention.

Referring now to FIG. 6, a diagram for one embodiment of FIG. 4 processor functional control module (processor FCM) 427 is shown, in accordance with the present invention, In the FIG. 6 embodiment, processor FCM 427 includes, but is not limited to, a processor manager 612, a sniplet manager 614, and a loading model 616. In alternate embodiments, processor FCM 427 may include various elements that are different from, or in addition to, those discussed in conjunction with the FIG. 6 embodiment.

In the FIG. 6 embodiment, DCM manager 416 preferably instantiates processor FCM 427 in a local host device 112 to represent and control another remote hosted device on network 110. The remote hosted device is typically a base device or a legacy device, as discussed above in conjunction with FIG. 3. Processor FCM 427 preferably may be utilized to interact between a local software module and the remote hosted device. In alternate embodiments, processor FCM 427 may be located in the remote device for use by the local device to analyze processing capabilities of the remote device.

In the FIG. 6 embodiment, a local software module (such as device application(s) 312 or any other software element of network software 316) may utilize processor manager 612 to control a corresponding processor of a remote hosted device in network 110. For example, the software module may transmit a processor request to processor FCM 427 for causing the remote processor to move between a low power state and a high power state for energy conservation or efficiency reasons. In response, processor FCM 427 may translate the processor request into an underlying processor command, and then propagate the processor command to the remote device for appropriate action.

Similarly, in the FIG. 6 embodiment, a local software module (such as device application(s) 312 or any other software element in network software 316) may utilize sniplet manager 61 z to perform a sniplet procedure with a corresponding remote hosted device of network 1 10. In practice, the software module preferably may transmit a sniplet (a segment of software code) to processor FCM 427. In response, processor FCM 427 preferably propagates the sniplet to a corresponding hosted device for execution, in accordance with the present invention. The utilization of sniplets is further discussed below in conjunction with FIGS. 9 and 10.

In accordance with the present invention, processor FCM 426 also includes a loading module 616 that a local software module (such as device applications 312 or any other software element in network software 316) may utilize to determine current processor loading characteristics of a remote hosted device. The utilization of loading, module 616 is further discussed below in conjunction with FIGS. 9 and 10.

Figure 7:
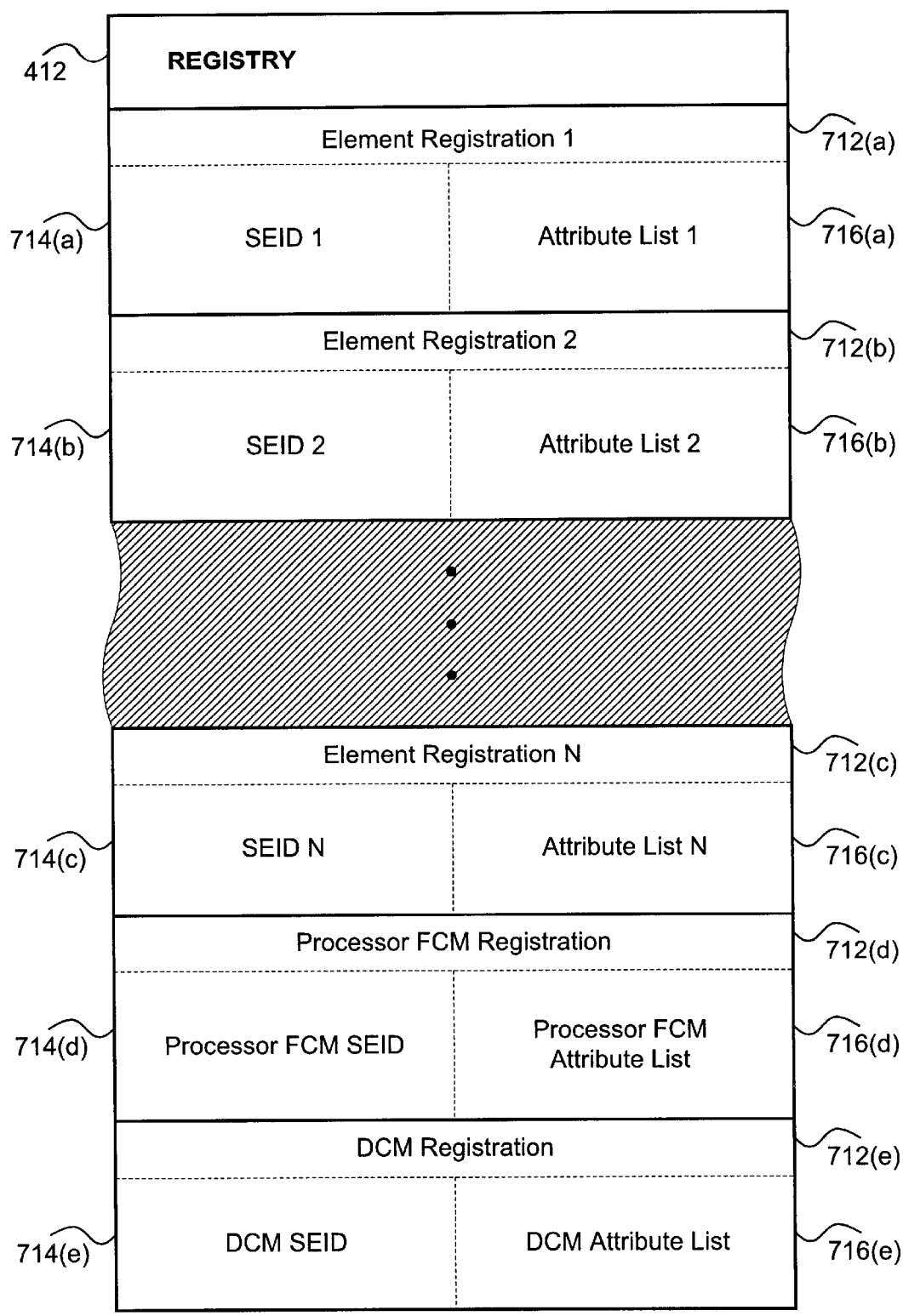
FIG. 7 is a diagram for one embodiment of the registry of FIG. 4, in accordance with the present invention.

Referring now to FIG. 7, a diagram for one embodiment of the FIG. 4 registry 412 is shown, in accordance with the present invention. In the FIG. 7 embodiment, registry 412 preferably includes an element registration 1 (712(a)) through an element registration N (712(c)). Registry 412 also preferably includes a processor FCM registration 712 (d) and a DCM is registration 712(e). Each FIG. 7 eleme!nt registration 712(a) through 712(c) preferably corresponds to a local software element in local device 112. For example, any one of element registration 512(a) through 512 (c) may uniquely correspond to an associated software element from network software 316 (FIG. 4).

In the FIG. 7 embodiment, each element registration 712(a) through 712(c) preferably includes a software element identifier (SEID) and a corresponding attribute list. Therefore, element registration 1 (712(a)) through element registration N (712(c)) each preferably include a corresponding respective SEID 1 (714(a)) through SEID N (714(c)), and a associated respective attribute list 1 (716(a)) through attribute list N (716(c)). In alternate embodiments, registry 412 may readily be configured to include various components in addition to, or instead of, those shown in the FIG. 7 embodiment.

In the FIG. 7 embodiment, each SEID 1 (714(a)) through SEID N (714(c)) preferably includes a global unique identifier (GUID) and a software element local handle (SELH) that are used to uniquely identify a specific software element in network 110. Attribute list 1 (716(a)) through attribute list N (716(c)) preferably each include relevant information corresponding to the associated software element. For example, such relevant information may include, but is not limited to, an element manufacturer, an element model, a version level, and various other element features.

In accordance with the present invention, processor FCM registration 712(d) preferably corresponds to a processor FCM 427 for a remote hosted device on network 110. In the FIG. 7 embodiment, processor FCM registration 712(d) preferably includes a processor FCM SEID 714(d) and a corresponding processor FCM attribute list 716(d). In alternate embodiments, processor FCM registration 712(d) may readily be configured to include various components in addition to, or instead of those shown in the FIG. 7 embodiment.

In the FIG. 7 embodiment, processor FCM SEID 714(d) preferably includes a global unique identifier (GUID) and a software element local handle (SELH) that are used to uniquely identify a specific processor FCM 427 in network 110. Processor FCM attribute list 716(d) preferably includes relevant information corresponding to the associated processor FCM 427. In accordance with the present invention, processor FCM attribute list 716(d) may also include various relevant information from processor capabilities 514 of the remote hosted device.

In the FIG. 7 embodiment, DCM registration 712(e) preferably corresponds to a DCM 422 for the corresponding remote hosted device on network 110. In the FIG. 7 embodiment, DCM registration 712(e) preferably includes a DCM SEID 714(e) and a corresponding DCM attribute list 716(e). In alternate embodiments, DCM registration 712(e) may readily be configured to include various components in additiona to, or instead of those shown in the FIG. 7 embodiment.

In the FIG. 7 embodiment, DCM SEID 714(e) preferably includes a global unique identifier (GUID) and a software element local handle (SELH) that are used to uniquely identify a specific DCM 422 in network 110. DCM attribute list 716(e) preferably includes relevant information corresponding to the associated DCM 422.

In the FIG. 7 embodiment, registry 412 may advantageously be utilized during communications between various software elements (including applications 312) in network 110. In order to send a message to a target element in network 110, a source element (such as an application 312) preferably identifies the target element by using the corresponding SEID 714 of that target element. In network 110, the source element preferably obtains the correct SEID 714 of the target element by accessing, from registry 412, the appropriate element registration 712 that uniquely corresponds to the target element. Once a source element locates an SEID 714 for a target element using any appropriate examination technique, then the source element may use the located SEID 714 to communicate with the corresponding target element via mess aging system 424 (FIG. 4).

Figure 8:
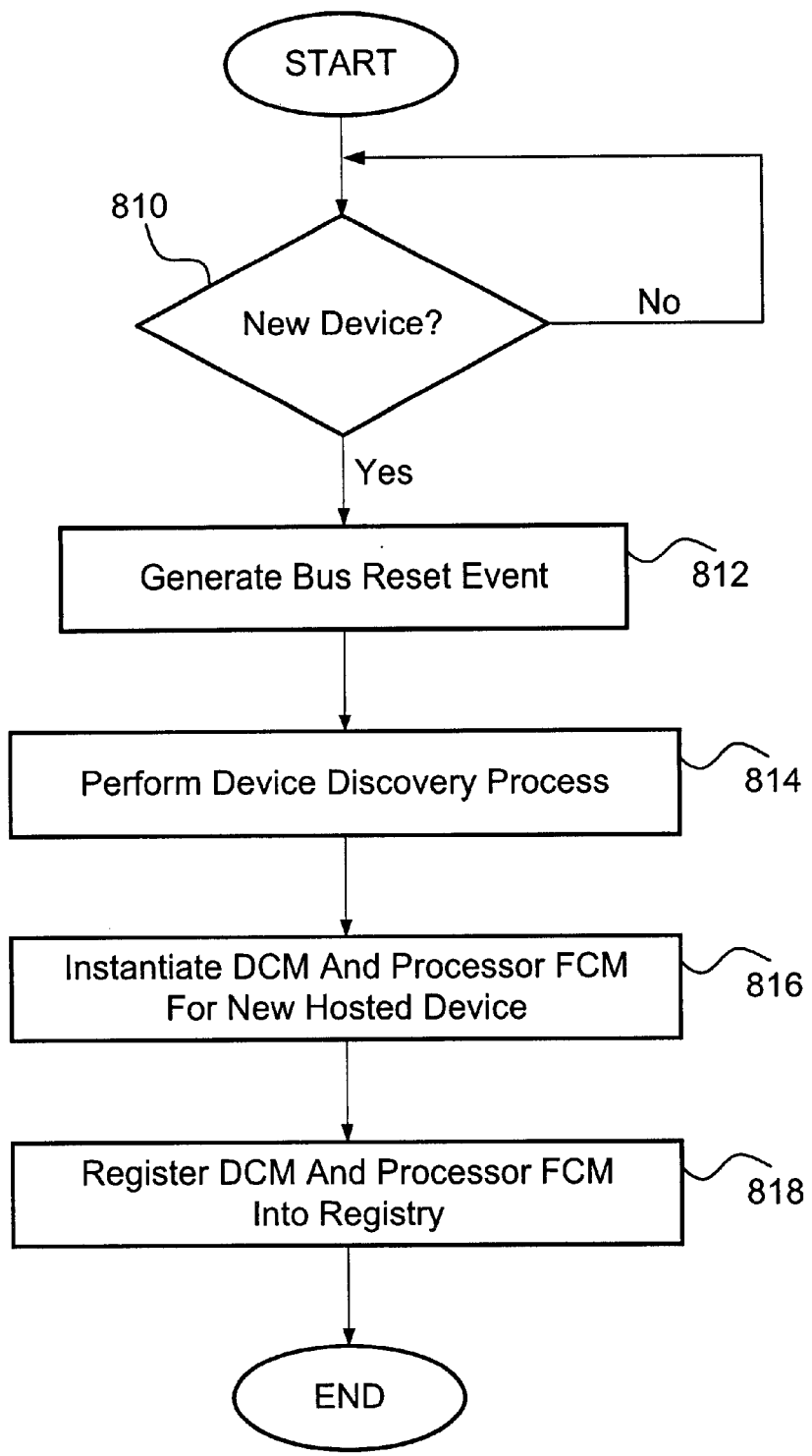
FIG. 8 is a flowchart of method steps for instantiating and registering a processor FCM for a new hosted device, in accordance with one embodiment of the present invention.

Referring now to FIG. 8, a flowchart of method steps for instantiating and registering a processor FCM 427 is shown, in accordance with one embodiment of the present invention. In the FIG. 8 embodiment, in step 810, network software 216 monitors network 110 to determine whether a system user has recently connected a new device to network 110.

If a system user has connected a new device to network 110, then, in step 812, network 110 preferably generates a bus reset event to notify interested devices 112 about the presence of the new device. In step 814, a local DCM manager 416 of network software 316 preferably performs a device discovery process for the new device.

In the FIG. 8 embodiment, DChl manager 416 preferably performs the foregoing device discovery process by querying various relevant configuration information stored in self-describing data (SDD) 320 (FIG. 3) of the new device. In accordance with the present invention, DCM manager 416 may also concurrently discover relevant processing capabilities 514 relating to the new device during the foregoing device discovery process. For example, SDD 320 may include various types of processing capabilities 514, as discussed above in conjunction with FIG. 5. In alternate embodiments, the processing capabilities 514 may be discovered in a query procedure that is separate from the foregoing device discovery process. In addition, processing capabilities 514 may readily include various other information in addition to, or instead of, that discussed above in conjunction with FIG. 5.

In step 816, DCM manager 416 preferably locally instantiates a new DCM 422 for controlling the new device on network 110, as discussed above in conjunction with FIG. 4. In addition, in step 816, DCM manager 416 preferably locally instantiates a new processor FCM 427 for interacting with the new device on network 110. Alternately, processor FCM 427 may be instantiated in the new device. Finally, in step 818, DCM manager 416 preferably creates a processor FCM registration 712(d) and a DCM registration 712(e) (FIG. 5) to register the new processor FCM 427 and the new DCM 422 into local registry 412.

In accordance with the present invention, the processor FCM registration 712(d) created in step 818 may include one or more processing capabilities 514 obtained from SDD 320 of the new device that was connected to network 110 in foregoing step 810. In alternate embodiments, FCM registration 712(d) may readily include various processing capability information that was obtained from sources other than SDD 320 of the new hosted device.

Figure 9:
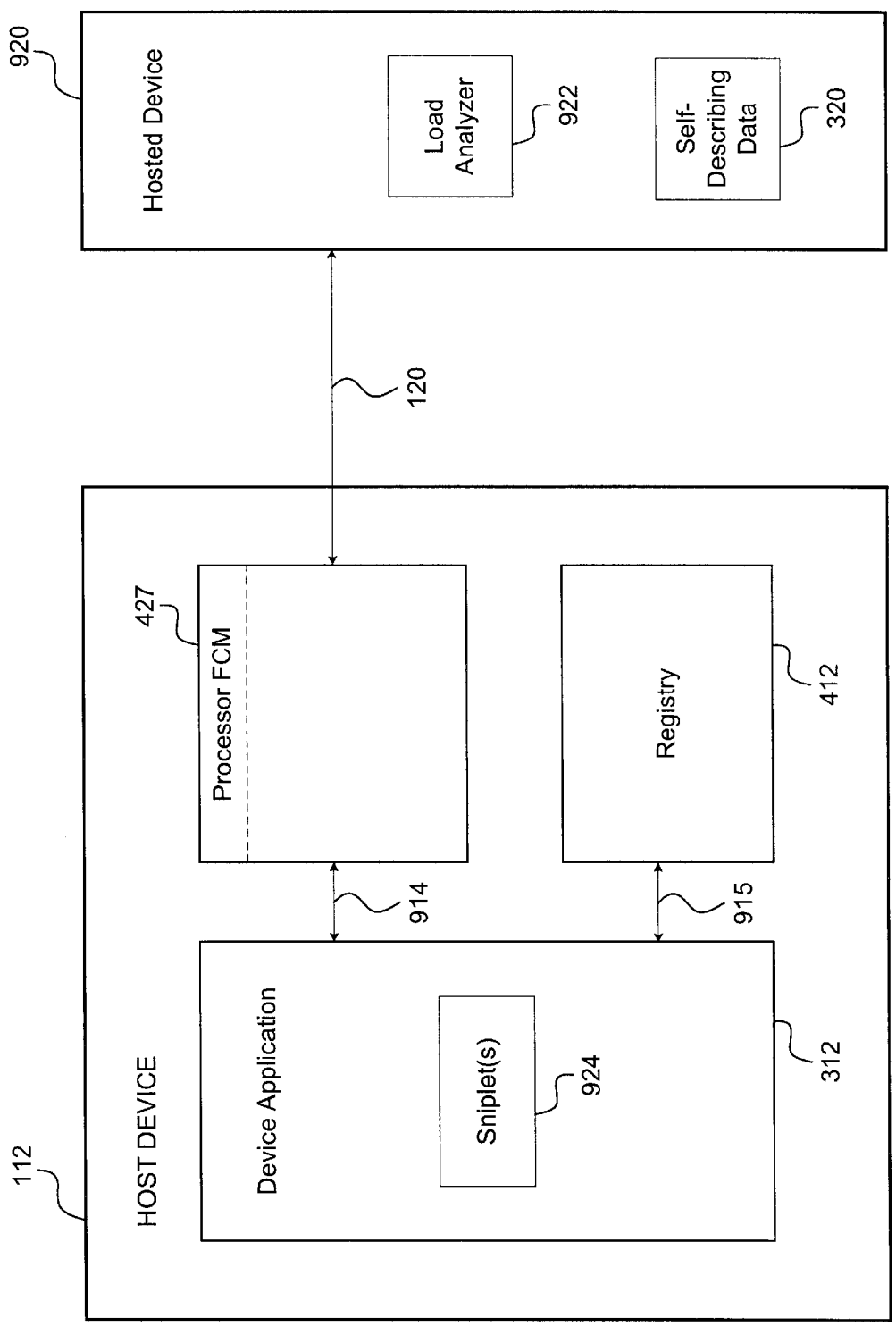
FIG. 9 is a diagram illustrating a technique for determining processing capabilities, in accordance with the present invention.

Referring now to FIG. 9, a diagram illustrating a technique for determining processing capabilities is shown, in accordance with the present invention. In the FIG. 9 embodiment, 112 host device 112 includes, but is not limited to, a device application 312, a processor FCM 426, and a registry 412. In addition, host device 112 preferably communicates bi-directionally with a hosted device 920 via system bus 120. The FIG. 9 technique preferably occurs in network 110 following the registration of processor FCM 426 in registry 412 based upon information obtained from self-describing data 320 of hosted device 920, as described above in conjunction with FIG. 8.

Furthermore, the FIG. 9 technique is described in the context of a single hosted device 920, however, in certain embodiments, host device 112 may readily utilize the FIG. 9 technique to compare individual processing capabilities for multiple hosted devices in network 110. Host device 112 may thus select the most capable and least heavily-loaded hosted device to perform a given processing task to thereby facilitate efficient processing-load balancing across network 110.

In the FIG. 9 embodiment, if device application 312 (or any other software module) requires a given hosted device 920 to perform a particular processing task, then device application. 312 preferably queries registry 412 for a processor FCM registration 712(d) corresponding to the processor FCM 427 of the given hosted device 920. Device application 412 may also query processor FCM attribute list 716(d) for relevant processor capabilities. Alternately, device application 412 may utilize processor FCM 427 to directly query self-describing data 320 of remote device 920 to obtain relevant processing capabilities 514.

Device application 320 may then determine whether hosted device 920 has sufficient processing capabilities 514 to perform the required processing task. In the case of multiple hosted devices, device application 320 may perform a first-level load-balancing process by similarly evaluating and comparing the processing capabilities of each hosted device to determine the most appropriate hosted devices based on relative processing capabilities.

Device application 320 may also transmits a get_load request to processor FCM 427 to determine the current processing load in hosted device 920. In response, loading module 616 of processor FCM 427 preferably propagates the get-load request to load analyzer 922 of hosted device 920. Load analyzer 922 then determines the current processing load of hosted device 920, and returns a current processing-load status to device application 312 via processor FCM 427.

In the FIG. 9 embodiment, the current processing-load status preferably may include one or more fields that correspond to various types of processing loads of the corresponding hosted device 920. In the FIG. 9 embodiment, the current processing-load status may include, but is not limited to, a processor load, a memory load, and an input/output (I/O) load. In certain embodiments, the processor load, the memory load, and the I/O load may be a scalar numerical rating (for example, a rating on a scale of one to ten). In alternate embodiments, the processor load, the memory load, and the I/O load may be provided in any other suitable format and in any other appropriate configuration.

In certain embodiments, the processor load (Li), the memory load (L2), and the I/O load (L3) may be combined into a combined processing-load value (LV) that is preferably weighted based on the relative significance of the various loads. In the FIG. 9 embodiment, the combined processing-load value (LV) may be weighted in a 3-2-1 ratio according to the following formula:

LV=3(L1)+2(L2)+1(L1)

In alternate embodiments, the combined processing-load value may be calculated with loading variables in addition to, or instead of, those of the FIG. 9 embodiment. Similarly, in alternate embodiments, the weighting ratio may also be different that that of the FIG. 9 embodiment.

Device application 320 may then determine whether hosted device 920 is too heavily loaded to perform the required processing task. In the case of multiple hosted devices, device application 320 may perform a second-level load-balancing process by similarly evaluating and comparing the processing loads of each hosted device to determine the most appropriate hosted devices based on relative processing loads.

In accordance with the present invention, device application 312 may also advantageously utilize processor FCM 427 to perform a sniplet procedure using hosted device 920. In the FIG. 9 embodiment, sniplet(s) 924 preferably include segments of executable software code for assisting with a particular task. Device application 312 may transmit one or more sniplet commands to processor FCM 427 which responsively causes hosted device 920 to perform corresponding actions. For example, sniplet commands may include, but are not limited to, a load_sniplet command, a start_sniplet command, a synch_sniplet command, a stop_sniplet command, and unload_sniplet, and a status command.

In the FIG. 9 embodiment, the load_sniplet command causes processor FCM 427 to transfer a designated sniplet 924 from device application 312 to hosted device 920. The load_sniplet command preferably includes a pointer to the desired sniplet 924 of device application 312, and various parameter values such as the amount of processor loading that executing the particular sniplet will add to hosted device 920. Hosted device 920 preferably returns a sniplet identifier (sniplet ID) to device application 312 via processor FCM 427.

The start_sniplet command causes hosted device 920 to begin executing the downloaded sniplet 924, and preferably includes the foregoing sniplet ID and an associated parameter array. The synch_sniplet command allows device application 312 to synchronize to the current sniplet execution process, and obtain a sniplet result based on the particular task of the executed sniplet 924. The synch_sniplet command preferably includes the sniplet ID and an array pointer.

The stop_sniplet command causes hosted device 920 to stop executing the current sniplet 924, and preferably includes the sniplet ID. The unload_sniplet command causes hosted device 920 to unload the current sniplet 924, and preferably includes the sniplet ID. The status command causes hosted device 920 to provide a current status corresponding to the downloaded sniplet 924, and preferably includes the sniplet ID. In accordance with the foregoing sniplet procedure, device application may therefore advantageously provide and control selectable segments of software code through processor FCM 427 for execution by hosted device 920.

Figure 10:
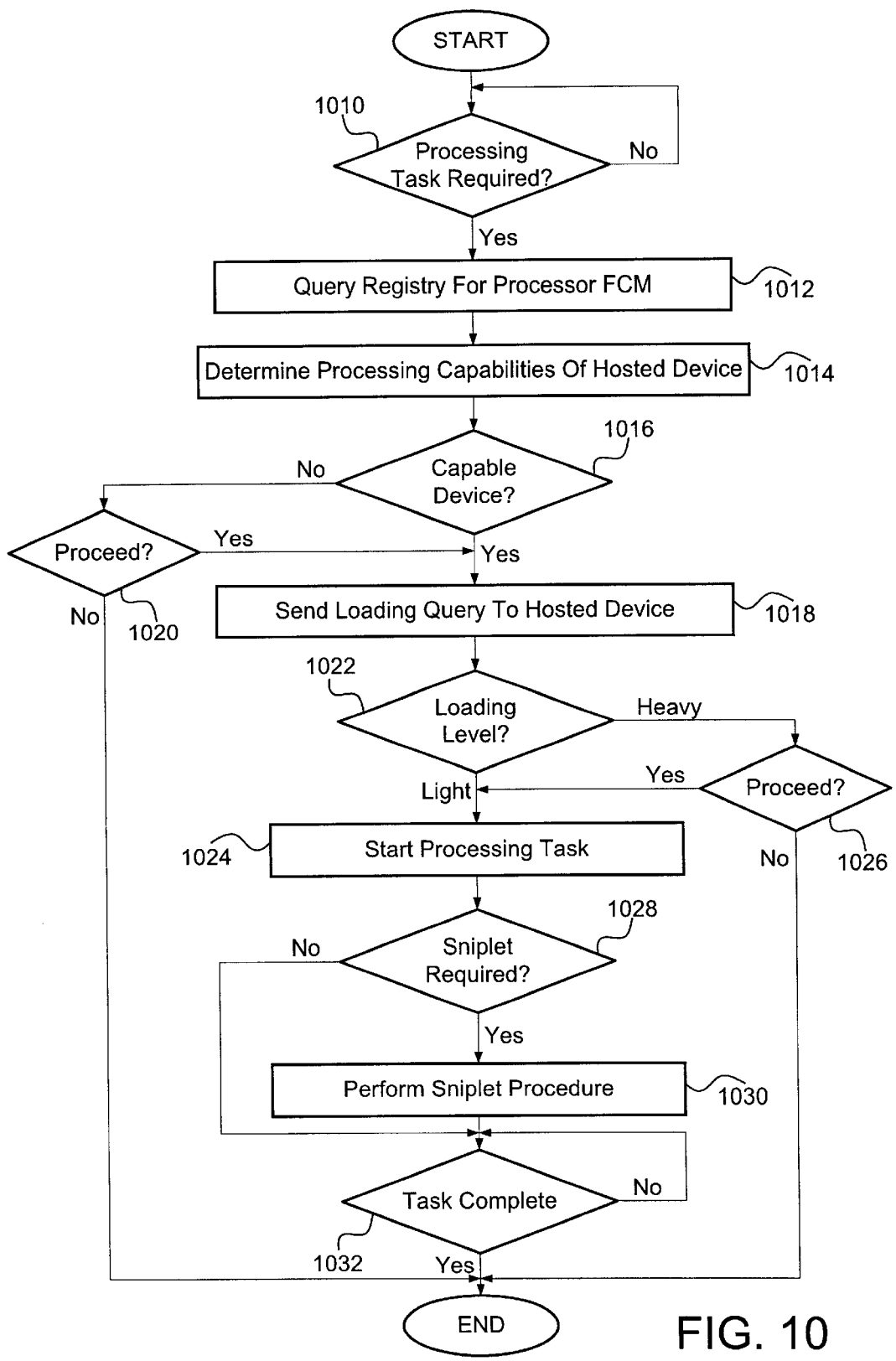
FIG. 10 is a flowchart of method steps for determining processing capabilities, in accordance with one embodiment of the present invention.

Referring now to FIG. 10, a flowchart of method steps for determining processing capabilities is shown, in accordance with one embodiment of the present invention. The FIG. 10 method is described in the context of a single hosted device 920. However, in certain embodiments, host device 112 may similarly utilize the FIG. 10 method to compare individual processing capabilities for multiple hosted devices in network 110. Host device 112 may thus advantageously select the most capable and least heavily-loaded hosted device to perform a given processing task to thereby facilitate efficient multi-level processing-load balancing across network 110.

In the FIG. 10 embodiment, initially, in step 1010, device application 312 (or any other appropriate software module) determines whether a particular processing task is required. If a processing task is required, then, in step 1012, device application 312 preferably queries registry 412 for one or more appropriate processor FCMs 427 that correspond to hosted devices 920 in network 110.

In step 1014, device application 312 determines processing capabilities for the corresponding hosted device 920 preferably based on information originally stored in SDD 320 of the hosted device, and subsequently transferred to processor FCM registration 712(d) of local registry 412 to facilitate efficient messaging.

In step 1016, device application 312 determines whether the hosted device 920 is a capable device based on the processing capabilities obtained in foregoing step 1014. If hosted device 920 is a capable device, then the FIG. 10 process advances to step 1018. However, if hosted device 920 is not a capable device, then, in step 1020, device application 312 determines whether to proceed with the FIG. 10 process. During step 1020, if the FIG. 10 process is simultaneously being performed on multiple hosted devices, then device application 312 may advantageously make a first-level evaluation of the relative capabilities of the various hosted devices before deciding whether to proceed in step 1020, in order to facilitate efficient load balancing across network 110.

In step 1020, if device application 312 determines not to proceed, then the FIG. 10 process terminates. However, if device application 312 determines to proceed, then, in step 1018, device application sends a loading query (get_load request) via processor FCM 427 to hosted device 920. Then, in step 1022, device application 312 examines a processing-load result from hosted device 920 to determine a current processing-load status for hosted device 920.

If hosted device 920 is lightly loaded, then the FIG. 10 process advances to step 1024. However, if hosted device 920 is heavily loaded, then, in step 1026, device application 312 determines whether to proceed with the FIG. 10 process. During step 1026, if the FIG. 10 process is simultaneously being performed on multiple hosted devices, then device application 312 may advantageously make a second-level evaluation of the relative processing loads of the various hosted devices before deciding whether to proceed in step 1026, in order to facilitate efficient load balancing across network 110.

In step 1026, if device application 312 determines not to proceed, then the FIG. 10 process terminates. However, if device application 312 determines to proceed, then, in step 1024, device application 312 initiates the processing task on hosted device 920 through processor FCM 427. In step 1028, device application 312 determines whether a sniplet procedure is required, as described above in conjunction with FIG. 9.

If a sniplet procedure is not required, then the FIG. 10 process advances to step 1032. However, if a sniplet procedure is required, then, assuming that hosted device 920 supports the sniplet procedure, in step 1030, device application 312, processor FCM 427, and hosted device 920 cooperate to perform the sniplet procedure. Finally, in step 1032, device application 312, processor FCM 427, and hosted device 920 continue to perform the current processing task until its completion, and then the FIG. 10 process terminates.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for determining processing capabilities in an electronic network, comprising:

a remote device coupled to said electronic network for performing a processing task;

a processor FCM configured to determine said processing capabilities of said remote device; and a processor device configured to control said processor FCM, wherein a device application in a host device on said electronic network queries a local registry to locate said processor FCM to perform said processing task, and wherein said device application performs a first level load-balancing procedure by comparing said processing capabilities for a plurality of remote devices in said network, and identifying capable devices for performing said processing task.

2. The system of claim 1 wherein said processor FCM operates in conjunction with network software that is configured to comply with a home audio-video interoperability specification.

3. The system of claim 1 wherein said electronic network is connected through a network bus configured using an IEEE 1394 interconnectivity standard.

4. The system of claim 1 wherein said remote device is implemented as a hosted consumer electronics device in said electronic network.

5. The system of claim 1 wherein said processing capabilities include one of a processor capability, a memory capability, an input/output capability, a processor loading capability, and a sniplet execution capability.

6. The system of claim 1 wherein a host device creates and locally-registers said processor FCM to include self-describing data from said remote device, and wherein a device application utilizes said processor FCM to query said self-describing data for determining said processing capabilities in order to perform a first-level load-balancing procedure, said device application also utilizing said processor FCM to obtain a current processing-load status from said hosted device to thereby perform a second-level load-balancing procedure.

7. The system of claim 1 wherein a DCM manager performs a device discovery procedure following a connection of said remote device to said electronic network, said DCM manager examining self-describing data in said remote device to learn about said processing capabilities during said device discovery procedure.

8. The system of claim 7 wherein said DCM manager instantiates said processor FCM to interact with said remote device on said electronic network, said processor FCM including at least one of a processor manager, a sniplet manager, and a loading module.

9. The system of claim 8 wherein said DCM manager creates a processor FCM registration in a local registry, said processor FCM registration including said processing capabilities from said self-describing data.

10. The system of claim 1 wherein said processing capabilities include at least one of a processor capability, a memory capability, and an input/output capability, said processing capabilities each being represented by a scalar numerical value.

11. The system of claim 10 wherein said processor capability, said memory capability, and said input/output capability are combined into a weighted processing capability rating in which said processor capability is weighted as three, said memory capability is weighted as two, and said input/output capability is weighted as one.

12. The system of claim 1 wherein said device application analyzes a processor FCM registration corresponding to said processor FCM, said processor FCM registration being in said local registry and including said processing capabilities.

13. The system of claim 12 wherein said device application utilizes said processor FCM to send a get load request to said remote device to determine a current processing load for said remote device.

14. The system of claim 13 wherein said remote device returns a current processing-load status to said device application in response to said get-load request.

15. The system of claim 14 wherein said current processing-load status includes a processor load, a memory load, and an input/output load that each are represented by a scalar numerical value, said processor load, said memory load, and said input/output load being combined into a weighted processing-load rating in which said processor load is weighted as three, said memory load is weighted as two, and said input/output load is weighted as one.

16. The system of claim 14 wherein said device application performs a second-level load-balancing procedure by comparing said current processing-load status for a plurality of remote devices in said electronic network, and identifying lightly-loaded devices for performing said processing task.

17. The system of claim 1 wherein a device application in a host device utilizes said processor FCM to perform a sniplet procedure whereby said remote device downloads and executes one or more sniplets of software code that are provided by said device application for assisting in said processing task.

18. The system of claim 17 wherein said device application, said processor FCM, and said remote device cooperate to perform sniplet commands that include at least one of a load-sniplet command, a start_sniplet command, a synch_sniplet command, a stop_sniplet command, an unload_sniplet command, and a status command.

19. A method for determining processing capabilities in an electronic network, comprising the steps of:

connecting a remote device to said electronic network for performing a processing task;

determining said processing capabilities of said remote device with a processor FCM; and controlling said processor FCM with a processor device, wherein a device application in a host device on said electronic network queries a local registry to locate said processor FCM to perform said processing task, and wherein said device application performs a first level load-balancing procedure by comparing said processing capabilities for a plurality of remote devices in said network, and identifying capable devices for performing said processing task.

20. The method of claim 19 wherein said processor FCM operates in conjunction with network software that is configured to comply with a home audio-video interoperability specification.

21. The method of claim 19 wherein said electronic network is connected through a network bus configured using an IEEE 1394 interconnectivity standard.

22. The method of claim 19 wherein said remote device is implemented as a hosted consumer electronics device in said electronic network.

23. The method of claim 19 wherein said processing capabilities include one of a processor capability, a memory capability, an input/output capability, a processor loading capability, and a sniplet execution capability.

24. The method of claim 19 wherein a host device creates and locally-registers said processor FCM to include self-describing data from said remote device, and wherein a device application utilizes said processor FCM to query said self-describing data for determining said processing capabilities in order to perform a first-level load-balancing procedure, said device application also utilizing said processor FCM to obtain a current processing-load status from said hosted device to thereby perform a second-level load-balancing procedure.

25. The method of claim 19 wherein a DCM manager performs a device discovery procedure following a connection of said remote device to said electronic network, said DCM manager examining self-describing data in said remote device to learn about said processing capabilities during said device discovery procedure.

26. The method of claim 25 wherein said DCM manager instantiates said processor FCM to interact with said remote device on said electronic network, said processor FCM including at least one of a processor manager, a sniplet manager, and a loading module.

27. The method of claim 26 wherein said DCM manager creates a processor FCM registration in a local registry, said processor FCM registration including said processing capabilities from said self-describing data.

28. The method of claim 19 wherein said processing capabilities include at least one of a processor capability, a memory capability, and an input/output capability, said processing capabilities each being represented by a scalar numerical value.

29. The method of claim 28 wherein said processor capability, said memory capability, and said input/output capability are combined into a weighted processing capability rating in which said processor capability is weighted as three, said memory capability is weighted as two, and said input/output capability is weighted as one.

30. The method of claim 19 wherein said device application analyzes a processor FCM registration corresponding to said processor FCM, said processor FCM registration being in said local registry and including said processing capabilities.

31. The method of claim 30 wherein said device application utilizes said processor FCM to send a get_load request to said remote device to determine a current processing load for said remote device.

32. The method of claim 31 wherein said remote device returns a current processing-load status to said device application in response to said get-load request.

33. The method of claim 32 wherein said current processing-load status includes a processor load, a memory load, and an input/output load that each are represented by a scalar numerical value, said processor load, said memory load, and said input/output load being combined into a weighted processing-load rating in which said processor load is weighted as three, said memory load is weighted as two, and said input/output load is weighted as one.

34. The method of claim 32 wherein said device application performs a second-level load-balancing procedure by comparing said current processing-load status for a plurality of remote devices in said electronic network, and identifying lightly-loaded devices for performing said processing task.

35. The method of claim 19 wherein a device application in a host device utilizes said processor FCM to perform a sniplet procedure whereby said remote device downloads and executes one or more sniplets of software code that are provided by said device application for assisting in said processing task.

36. The method of claim 19 wherein said processor FCM is implemented as part of said remote device.

37. A computer readable medium comprising program instructions for determining processing capabilities in an electronic network by performing the steps of:
connecting a remote device to said electronic network for performing a processing task;
determining said processing capabilities of said remote device with a processor FCM; and
controlling said processor FCM with a processor device, wherein a device application in a host device on said electronic network queries a local registry to locate said processor FCM to perform said processing task, and wherein said device application performs a first level load-balancing procedure by comparing said processing capabilities for a plurality of remote devices in said network, and identifying capable devices for performing said processing task.

38. A system for determining processing capabilities in an electronic network, comprising:
connecting means for connecting a remote device to said electronic network for performing a processing task;
determining means for determining said processing capabilities of said remote device; and
controlling means for controlling said means for determining said processing capabilities, wherein a device application in a host device on said electronic network queries a local registry to locate said processor FCM to perform said processing task, and wherein said device application performs a first level load-balancing procedure by comparing said processing capabilities for a plurality of remote devices in said network, and identifying capable devices for performing said processing task.

* * * * *